US010491297B2

(12) United States Patent
Nijssen et al.

(10) Patent No.: US 10,491,297 B2
(45) Date of Patent: Nov. 26, 2019

(54) DETECTING SIGNALS EMBEDDED IN VISIBLE LIGHT

(71) Applicant: SIGNIFY HOLDING B.V., Eindhoven (NL)

(72) Inventors: Stephanus Joseph Johannes Nijssen, Eindhoven (NL); Frederik Jan De Bruijn, Eindhoven (NL); Gerardus Cornelis Petrus Lokhoff, Eindhoven (NL); Peter Hoekstra, Waalre (NL); Benjamin Johannes Vos, Eindhoven (NL); Onno Martin Janssen, Geldrop (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/318,941

(22) PCT Filed: Jul. 10, 2017

(86) PCT No.: PCT/EP2017/067263
§ 371 (c)(1),
(2) Date: Jan. 18, 2019

(87) PCT Pub. No.: WO2018/015194
PCT Pub. Date: Jan. 25, 2018

(65) Prior Publication Data
US 2019/0238225 A1 Aug. 1, 2019

(30) Foreign Application Priority Data

Jul. 21, 2016 (EP) ..................................... 16180477

(51) Int. Cl.
H04B 10/116 (2013.01)
H04N 5/232 (2006.01)
(Continued)

(52) U.S. Cl.
CPC ....... *H04B 10/116* (2013.01); *H04B 10/1149* (2013.01); *H04N 5/2254* (2013.01); *H04N 5/23229* (2013.01); *H04B 10/502* (2013.01)

(58) Field of Classification Search
CPC combination set(s) only.
See application file for complete search history.

(56) References Cited

U.S. PATENT DOCUMENTS

2004/0164667 A1\* 8/2004 Dedene ............... H01L 27/3218
313/500
2013/0251374 A1\* 9/2013 Chen .................. H04B 10/1141
398/118

(Continued)

FOREIGN PATENT DOCUMENTS

EP 1450408 A2 8/2004
WO WO2014187760 A1 11/2014
WO WO2016001339 A1 1/2016

*Primary Examiner* — Omar S Ismail
(74) *Attorney, Agent, or Firm* — Meenakshy Chakravorty

(57) ABSTRACT

Multiple luminaires are mounted contiguously in a plane, along a straight line or following a one or two dimensional contour, but with a visible periphery between each adjacent pair. A different signal is embedded into the visible illumination emitted by each luminaire, which an image processing module can detect from one or more images captured by a camera. An angle-dependent mask is arranged to cover at least the periphery between adjacent luminaires, such that an appearance of the periphery when viewed from the environment through the mask varies as a function of viewing angle, becoming less visible at greater values of viewing angle (being the angle between a corresponding viewing direction and a normal to the plane, line or contour). The image processing module distinguishes between the different signals based on the periphery being visible when captured from less than a predetermined value of the viewing angle.

13 Claims, 9 Drawing Sheets

(51) Int. Cl.
*H04B 10/114* (2013.01)
*H04N 5/225* (2006.01)
*H04B 10/50* (2013.01)

(56) References Cited

U.S. PATENT DOCUMENTS

| | | | |
|---|---|---|---|
| 2013/0266314 A1* | 10/2013 | Lee | H04B 10/2507 |
| | | | 398/43 |
| 2015/0093107 A1* | 4/2015 | Jovicic | H04B 10/116 |
| | | | 398/25 |
| 2015/0188632 A1* | 7/2015 | Aoyama | H04B 10/116 |
| | | | 398/118 |
| 2015/0276399 A1* | 10/2015 | Breuer | G01C 3/08 |
| | | | 356/4.03 |
| 2015/0280821 A1 | 10/2015 | Breuer et al. | |
| 2015/0281905 A1* | 10/2015 | Breuer | H04W 4/026 |
| | | | 398/118 |
| 2015/0282282 A1* | 10/2015 | Breuer | H05B 37/0272 |
| | | | 315/152 |
| 2016/0300853 A1* | 10/2016 | Yamazaki | G09G 3/20 |
| 2017/0104531 A1* | 4/2017 | Aggarwal | H04B 10/116 |
| 2018/0227555 A1 | 8/2018 | Engelen et al. | |
| 2018/0235049 A1 | 8/2018 | Montagne | |

* cited by examiner

DETECTING SIGNALS EMBEDDED IN VISIBLE LIGHT

CROSS-REFERENCE TO PRIOR APPLICATIONS

This application is the U.S. National Phase application under 35 U.S.C. § 371 of International Application No. PCT/EP2017/067263, filed on Jul. 10, 2017, which claims the benefit of European Patent Application No. 16180477.8, filed on Jul. 21, 2016. These applications are hereby incorporated by reference herein.

TECHNICAL FIELD

The present disclosure relates to the embedding of signals in visible light, and to the detection of such signals using a camera.

BACKGROUND

Visible light communication (VLC) refers to the communication of information by means of a signal embedded in visible light, sometimes also referred to as coded light. The information is embedded by modulating a property of the visible light according to any suitable modulation technique. E.g. according to one example of a coded light scheme, the intensity of the visible light from each of multiple light sources is modulated to form a carrier waveform having a certain modulation frequency, with the modulation frequency being fixed for a given one of the light sources but different for different ones of the light sources such that the modulation frequency acts as a respective identifier (ID) of each light source. In more complex schemes a property of the carrier waveform may be modulated in order to embed symbols of data in the light emitted by a given light source, e.g. by modulating the amplitude, frequency, phase or shape of the carrier waveform in order to represent the symbols of data. In yet further possibilities, a baseband modulation may be used i.e. there is no carrier wave, but rather symbols are modulated into the light as patterns of variations in the brightness of the emitted light. This may either be done directly (intensity modulation) or indirectly (e.g. by modulating the mark:space ratio of a PWM dimming waveform, or by modulating the pulse position).

The current adoption of LED technology in the field of lighting has brought an increased interest in the use of coded light to embed signals into the illumination emitted by luminaires, e.g. room lighting, thus allowing the illumination from the luminaires to double as a carrier of information. Preferably the modulation is performed at a high enough frequency and low enough modulation depth to be imperceptible to human vision, or at least such that any visible temporal light artefacts (e.g. flicker and/or strobe effects) are weak enough to be tolerable to humans.

Based on the modulations, the information in the coded light can be detected using a photodetector. This can be either a dedicated photocell, or a camera comprising an array of photocells (pixels) and a lens for forming an image on the array. E.g. the camera may be a general purpose camera of a mobile user device such as a smartphone or tablet. Camera based detection of coded light is possible with either a global-shutter camera or a rolling-shutter camera (e.g. rolling-shutter readout is typical to mobile CMOS image sensors found in mobile devices such as smartphones and tablets). In a global-shutter camera the entire pixel array (entire frame) is captured at the same time, and hence a global shutter camera captures only one temporal sample of the light from a given luminaire per frame. In a rolling-shutter camera on the other hand, the frame is divided into lines (typically horizontal rows) and the frame is exposed line-by-line in a temporal sequence, each line in the sequence being exposed at a slightly later time than the last. Thus the rolling-shutter readout causes fast temporal light modulations to translate into spatial patterns in the line-readout direction of the sensor, from which the encoded signal can be decoded. Hence while rolling-shutter cameras are generally the cheaper variety and considered inferior for purposes such as photography, for the purpose of detecting coded light they have the advantage of capturing more temporal samples per frame, and therefore a higher sample rate for a given frame rate. Nonetheless coded light detection can be achieved using either a global-shutter or rolling-shutter camera as long as the sample rate is high enough compared to the modulation frequency or data rate (i.e. high enough to detect the modulations that encode the information).

Coded light has many possible applications. For instance a different respective ID can be embedded into the illumination emitted by each of the luminaires in a given environment, e.g. those in a given building, such that each ID is unique at least within the environment in question. E.g. the unique ID may take the form of a unique modulation frequency or unique sequence of symbols. This can then enable any one or more of a variety of applications. For example if a mobile device for remotely controlling the luminaires is equipped with a light sensor such as a camera, then the user can direct the sensor toward a particular luminaire or subgroup of luminaires so that the mobile device can detect the respective ID(s) from the emitted illumination captured by the sensor, and then use the detected ID(s) to identify the corresponding one or more luminaires in order to control them. This provides a user-friendly way for the user to identify which luminaire or luminaires he or she wishes to control. E.g. the mobile device may take the form of a smartphone or tablet running a lighting control app, with the app being configured to detect the embedded IDs from the captured light and enact the corresponding control functionality.

As another example, there may be provided a location database which maps the ID of each luminaire to its location (e.g. coordinates on a floorplan), and this database may be made available to mobile devices from a server via one or more networks such as the Internet and/or a wireless local area network (WLAN). Then if a mobile device captures an image or images containing the light from one or more of the luminaires, it can detect their IDs and use these to look up their locations in the location database in order to detect the location of the mobile device based thereon. E.g. this may be achieved by measuring a property of the received light such as received signal strength, time of flight and/or angle of arrival, and then applying technique such as triangulation, trilateration, multilateration or fingerprinting, or simply by assuming that the location of the nearest or only captured luminaire is approximately that of the mobile device (and in some cases such information may be combined with information from other sources, e.g. on-board accelerometers, magnetometers or the like, in order to provide a more robust result). The detected location may then be output to the user through the mobile device for the purpose of navigation, e.g. showing the position of the user on a floorplan of the building. Alternatively or additionally, the determined location may be used as a condition for the user to access a location based service. E.g. the ability of the user to use his or her mobile device to control the lighting (or another utility such as heating) in a certain region (e.g. a certain room) may be made conditional on the location of his or her mobile device detected to be within that same region (e.g. the same room), or perhaps within a certain control zone associated with the lighting in question. Other forms of location-based service may include, e.g., the ability to make or accept location-dependent payments.

As another example, a database may map luminaire IDs to location specific information such as information on a particular museum exhibit in the same room as a respective one or more luminaires, or an advertisement to be provided to mobile devices at a certain location illuminated by a respective one or more luminaires. The mobile device can then detect the ID from the illumination and use this to look up the location specific information in the database, e.g. in order to display this to the user of the mobile device. In further examples, data content other than IDs can be encoded directly into the illumination so that it can be communicated to the receiving device without requiring the receiving device to perform a look-up.

Thus the use of a camera to detect coded light has various commercial applications in the home, office or elsewhere, such as a personalized lighting control, indoor navigation, location based services, etc.

Typically for such applications the so-called front-facing camera of the smartphone is used (the camera on the same face as the device's main screen, typically a touchscreen). Thus the camera directly captures the luminaires on the ceiling above the user while also keeping the device's screen suitably orientated to be viewed by the user. FIGS. 2a and 2b show an example of a lighting system composed of adjacent luminaires in the form of ceiling tiles. FIG. 2a shows the humanly visible appearance to the human user the fast modulation of the coded light is imperceptible and the light intensity appears constant. FIG. 2b on the other hand shows the appearance as captured by a rolling shutter camera under short exposure capture (with the dashed line indicating the rolling-shutter readout direction). Here the coded light modulation appears as spatial patterns in each of the luminaires, each of which associated with a different specific code, e.g. different respective ID. In the example shown the capture is by a rolling-shutter camera such that the message from each luminaires appears as a different spatial pattern in the captured image. However it will be appreciated that capture with a global-shutter camera is also possible, in which case the modulation is a captured as a temporal modulation over multiple frames (and in fact with a rolling-shutter camera, in some cases the pattern from multiple frames may be stitched together).

In other forms of wireless data communication, 'channel separability' has to be implemented by mathematical signal orthogonality, e.g. the use of sine waves of different frequency, or more generally frequency multiplexing; or else by the use of a transmission protocol, e.g. use of repeated transmission using randomized packet intervals (the so-called ALOHA protocol). But when multiple luminaires simultaneously fill the field of view of the camera, such that multiple luminaires emitting different signals are captured in the same frame, then image-based segmentation can be used to separate the different luminaires prior to decoding of the information embedded in the coded light. I.e. camera based detection of coded light has the advantage that when light is received simultaneously from multiple coded light sources, it is also received with spatial separation between the light from the different sources, because this light appears in different spatial regions of the image separated by a recognizable gap or division in between (e.g. see again FIG. 2a). The image-based segmentation essentially provides a form of channel separation among multiple signals that might be difficult or impossible to decode otherwise. Therefore, concurrent detection of multiple coded light sources does not have to rely on 'channel separability' as an inherent characteristic of the signals themselves.

SUMMARY

However, for aesthetic reasons it is common to concatenate multiple luminaires in order to form one single luminous surface without any visible transitions between the composing luminaires. Presently this is at odds with the desire to include a visible separation between luminaires in order to assist detection of coded light with a camera, where it can be necessary to first identify the separate composing luminaires before decoding the data embedded in the coded light from each. It would be desirable to provide the illusion of a uniform luminous surface to a human whilst still enabling segmentation of the individual composing luminaires to enable decoding of the individual embedded coded light signals.

The present invention solves this by providing a separating element that is detectable by the camera system but invisible to the human eye, preserving the desired uniform appearance of the light source. Particularly, this is achieved by means of an optical element with characteristic appearance that is different for different observation angles.

According to one aspect disclosed herein, there is provided a system comprising: multiple luminaires arranged to actively emit visible illumination to illuminate an environment; transmission circuitry arranged to embed a different respective signal into the visible illumination emitted by each of the multiple luminaires; and detecting equipment which comprises a camera for capturing one or more images of a plurality of said multiple luminaires, and an image processing module configured to detect the respective signals from the one or more images of those luminaires. The multiple luminaires are mounted contiguously in a plane (e.g. the ceiling), along a straight line (e.g. in the case of trunk lighting), or otherwise following a 1D or 2D contour (e.g. a curved ceiling or gantry); but with there being a visible periphery between each adjacent pair of the contiguous luminaires (i.e. a visible boundary between them), wherein visible illumination is not actively emitted from the periphery. Furthermore, the system comprises an angle-dependent mask arranged to cover at least the periphery between the adjacent luminaires. The mask is angle dependent in that an appearance of the periphery when viewed from said environment through said angle-dependent mask varies as a function of viewing angle, becoming less visible at greater values of the viewing angle (the viewing angle being the angle between a corresponding viewing direction and a normal to said plane, line or contour at a point at which the viewing direction intersects said plane, line or contour). Thus the angle-dependent mask may also be referred to as an anisotropic mask (having a masking property that is different depending on which direction it is viewed, measured or sampled from). The image processing module of the detecting equipment is configured to distinguish between the different signals embedded in the illumination from said plurality of luminaires based on the periphery between adjacent luminaires being visible in said one or more images through the angle-dependent mask when captured from less than a certain first value of the viewing angle. But beyond a second value of the viewing angle the periphery between adjacent luminaires is not noticeable to an average human or at least the periphery becomes substantially obscured to human viewers, wherein the second value is greater than or equal to the first value.

Thus advantageously, during perpendicular observation the luminaire separation is visible, e.g. as a dark band between the luminaires, allowing it to be used by the image processing module for channel separation; whereas during oblique observation by humans in the environment, little or no separation is visible such that the luminous area adopts a uniform appearance.

Note that the spatial separation allows the light from the different luminaires, and therefore the signals, to be distinguished from one another even when some or all of the plurality of luminaires appear simultaneously in the same image or simultaneously in each of a sequence of images capturing the same view of the environment. In the case of a rolling-shutter camera, this may even allow detection from more than one luminaire appearing simultaneously in the same image (same frame).

Preferably the angle-dependent mask covers both the periphery between adjacent luminaires and the multiple luminaires themselves, such that the mask presents human viewers with a consistent appearance across the periphery regions and the multiple luminaires when viewed from greater than the second value of the viewing angle. The angle-dependent mask may take the form of a layer that is continuous across the multiple luminaires and the periphery between adjacent luminaires, or a regular array of elements which are continuous across the multiple luminaires and the periphery between adjacent luminaires. The continuous layer or array may be uniform across the multiple luminaires and the periphery between adjacent luminaires, so as to present as consistent an appearance as possible when viewed from greater than the second value of the viewing angle.

In embodiments the angle-dependent mask takes the form of a diffuser layer (arranged such that light travels a longer optical path when viewed from greater value of the angle than a lesser value of the viewing angle). The diffuser layer may be continuous across the multiple luminaires and the periphery between adjacent luminaires. The diffuser layer may be uniform across the multiple luminaires and the periphery between adjacent luminaires.

Alternatively, in embodiments the angle-dependent mask comprises collimating layer comprising a 1D or 2D array of collimating shields (preferably perpendicular to the plane, line or contour of the luminaires). The array of collimating shields may be a regular array that is continuous across the multiple luminaires and the periphery between adjacent luminaires. The array of collimating shields may be uniform across the multiple luminaires and the periphery between adjacent luminaires.

In embodiments the periphery may comprise a visible join or gap between each of the pairs of adjacent luminaires.

In embodiments, the periphery may be provided with a strip of light-absorbing material along at least one edge between each of the pairs of adjacent luminaires. And/or, in embodiments each of the multiple luminaires may comprises a set of light-emitting elements, and may be provided with a light-reflecting material between the light-emitting elements. The light absorbing and/or light reflecting materials help make the edge regions stand out more to the detecting device, and hence aid separation between the light from adjacent luminaires for detection purposes.

In embodiments, each of the luminaires is mounted substantially above the heads of end-users in the environment, e.g. on the ceiling.

In one example use case, the detector equipment comprises a mobile user terminal and the camera is a camera of the mobile user terminal. E.g. the mobile user terminal may be a smartphone or tablet, and said camera may be a front-facing camera of the smartphone or tablet.

According to another aspect disclosed herein, there is provided lighting equipment comprising: multiple luminaires arranged to actively emit visible illumination to illuminate an environment, the multiple luminaires being mounted contiguously in a plane, along a straight line or following a one or two dimensional contour, but with a visible periphery between each adjacent pair of the contiguous luminaires, wherein visible illumination is not actively emitted from the periphery; transmission circuitry arranged to embed a different respective signal into the visible illumination emitted by each of the multiple luminaires; and an angle-dependent mask arranged to cover at least the periphery between luminaires, such that an appearance of the periphery when viewed from said environment through said angle-dependent mask varies as a function of viewing angle, becoming less visible at greater values of the viewing angle, the viewing angle being the angle between a corresponding viewing direction and a normal to said plane, line or contour at a point at which the viewing direction intersects the plane, line or contour.

In embodiments each of the luminaires takes the form of a ceiling mountable luminaire.

According to another aspect disclosed herein, there is provided detecting equipment for detecting different respective signals embedded in visible illumination by multiple luminaires to illuminate an environment, the multiple luminaires being mounted contiguously in a plane, along a straight line or following a one or two dimensional contour, but with a visible periphery between each adjacent pair of the contiguous luminaires, wherein visible illumination is not actively emitted from the periphery; the detecting equipment comprising: a camera for capturing one or more images of a plurality of said multiple luminaires; and an image processing module configured to detect the respective signals from the one or more images of the plurality of luminaires; wherein the image processing module is configured to perform said detection based on a view, captured in the one or more images, through an angle-dependent mask covering at least the periphery between adjacent luminaires, such that an appearance of the periphery varies as a function of viewing angle, becoming less visible at greater values of the viewing angle, the viewing angle being the angle between a corresponding viewing direction and a normal to said plane, line or contour at a point at which the viewing direction intersects the plane, line or contour; the processing module being configured to distinguish between the different signals embedded in the illumination from said plurality of luminaires based on the periphery between adjacent luminaires being visible in said one or more images through the angle-dependent mask when captured from less than a predetermined value of the viewing angle.

According to another aspect disclosed herein, there is provided a method of emitting illumination comprising: using multiple luminaires to actively emit visible illumination to illuminate an environment, the multiple luminaires being mounted contiguously in a plane, along a straight line or following a one or two dimensional contour, but with a visible periphery between each adjacent pair of the contiguous luminaires, wherein visible illumination is not actively emitted from the periphery; and embedding a different respective signal into the visible illumination emitted by each of the multiple luminaires; where the emission of said illumination comprises emitting the illumination through an angle-dependent mask covering at least the periphery between adjacent luminaires, such that an appearance of the periphery when viewed from said environment through said angle-dependent mask varies as a function of viewing angle, becoming less visible at greater values of the viewing angle, the viewing angle being the angle between a corresponding viewing direction and a normal to said plane, line or contour at a point at which the viewing direction intersects the plane, line or contour.

According to another aspect disclosed herein, there is provided a method of detecting different respective signals embedded in visible illumination actively emitted by multiple luminaires to illuminate an environment, the multiple luminaires being mounted contiguously in a plane, along a straight line or following a one or two dimensional contour, but with a visible periphery between each adjacent pair of the contiguous luminaires, wherein visible illumination is not actively emitted from the periphery; the method comprising: using a camera to capture one or more images of a plurality of said multiple luminaires; and detecting the respective signals from the one or more images of the plurality of luminaires; wherein said detection is based on a view, captured in the one or more images, through an angle-dependent mask covering at least the periphery between adjacent luminaires, such that an appearance of the periphery varies as a function of viewing angle, becoming less visible at greater values of the viewing angle, the viewing angle being the angle between a corresponding viewing direction and a normal to said plane, line or contour at a point at which the viewing direction intersects the plane, line or contour; the detection comprising distinguishing between the different signals embedded in the illumination from said plurality of luminaires based on periphery between adjacent luminaires being visible in said one or more images through the angle-dependent mask when captured from less than a predetermined value of the viewing angle.

According to another aspect disclosed herein, there is provided a computer program product for detecting different respective signals embedded in visible illumination actively emitted by multiple luminaires to illuminate an environment, the multiple luminaires being mounted contiguously in a plane, along a straight line or following a one or two dimensional contour, but with a visible periphery between each adjacent pair of the contiguous luminaires, wherein visible illumination is not actively emitted from the periphery; the computer program product comprising code embodied on computer-readable storage and configured so as when run on one or more processing devices to perform operations of: using a camera to capturing one or more images of a plurality of said multiple luminaires; and detecting the respective signals from the one or more images of the plurality of luminaires; wherein the code is configured to perform said detection based on a view, captured in the one or more images, through an angle-dependent mask covering at least the periphery between adjacent luminaires, such that an appearance of the periphery varies as a function of viewing angle, becoming less visible at greater values of the viewing angle, the viewing angle being the angle between a corresponding viewing direction and a normal to said plane, line or contour at a point at which the viewing direction intersects the plane, line or contour; the code being configured to distinguish between the different signals embedded in the illumination from said plurality of luminaires based on the periphery between adjacent luminaires being visible in said one or more images through the angle-dependent mask when captured from less than a predetermined value of the viewing angle.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

The present invention is based on the observation that within a given frame captured by a camera, or even over two or three frames, the appearance of the encoded light signal may contain insufficient unique characteristics to identify the signal as being from one particular light source. As such, in the presence of a second coded light source, the local sum of the signals is not easily recognized as two distinct, differently encoded light contributions. To address this, some visible separation is needed between the light sources appearing in the captured image(s) so that the image processing module can distinguish between the signals based on their different, separated positions in the captured image.

The invention is also based on the observation that the humanly perceived illusion of an uninterrupted and uniform radiant surface (or output window) may only be required for oblique observation angles. Instead for perpendicular observation angles, the output window of a luminaire is generally so bright that a human observer tends to look away instantly (and in any case people typically do not tend to crane their heads back to look up completely vertically). This means that, under perpendicular view, an active luminaire does not necessarily have to contribute to the aforementioned uniform and uninterrupted appearance.

The present invention facilitates camera based light separation by having the lighting system exhibit a characteristic appearance that indicates the separation between adjacent, differently encoded luminaires. But at the same time this 'separator characteristic' is such that, under oblique observation angles, it is not recognizable as such, such that the desired illusion of an uninterrupted luminaire is maintained.

This is achieved by two elements: (i) a "separator element" comprising an angle-dependent mask placed over the visible surface of the luminaires, having the property that the appearance of the mask depends on the viewing angle, such that, under oblique viewing angles, the separation between luminaires is not visible; and (ii) a detector capable of detecting the separation between one or more pairs of adjacent luminaires from a camera image when viewed perpendicularly or less oblique angles, the detector preferably being implemented as an application running on a programmable mobile camera platform such as a smartphone or tablet.

Figure 3B:
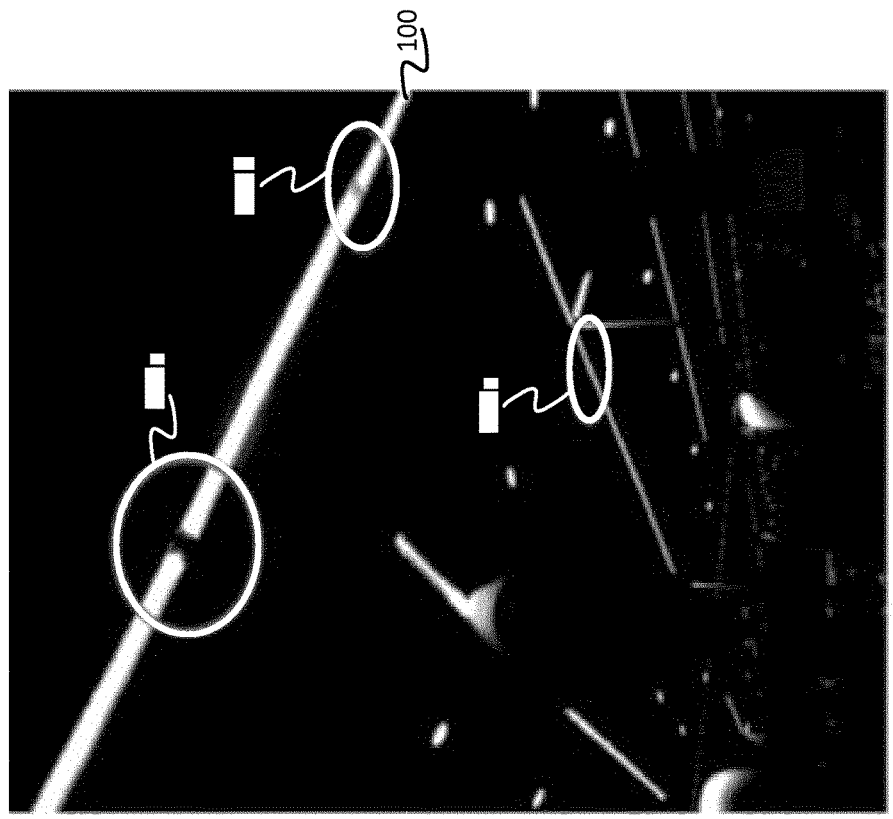
FIG. 3b is an image of an arrangement of concatenated luminaires including measures to obscure the boundary between adjacent luminaires as a function of viewing angle in accordance with embodiments of the present disclosure.
Figure 3A:
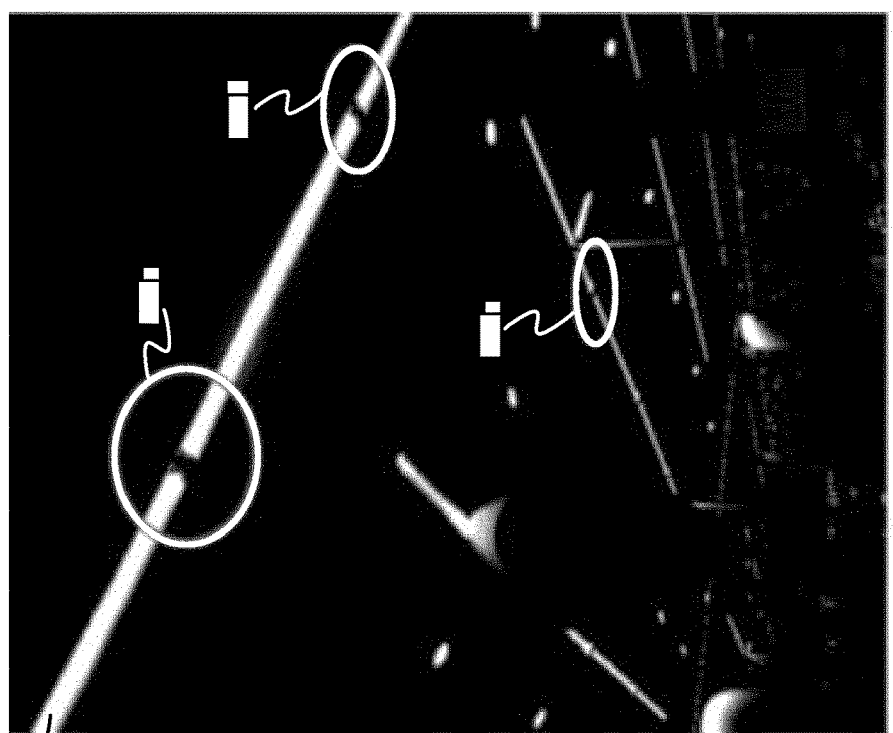
FIG. 3a is an image of an arrangement of concatenated luminaires without measures to obscure the boundary between adjacent luminaires.

FIGS. 3a and 3b show a simulated effect of the invention on the visible appearance of concatenated luminaires in an example use case. FIG. 3a shows a system of trunk lights with visible separations 301 between adjacent luminaires, both for nearby luminaires, under (almost) perpendicular view, as well as far away, under oblique view. FIG. 3b shows the same system of trunk lights where the separation 301c is not visible between the distant adjacent luminaires; only for the nearby luminaires, the separation 301a, 301b is visible due to the (almost) perpendicular observation angle. The ellipses highlight, for the purpose of illustration: the appearance of the separation 301a under (almost) perpendicular view, the separation 301b under a larger viewing angles, and the separation 301c under an oblique angle. The appearance changes as a function of viewing angle; from perpendicular to oblique, the separation revealed by the mask gradually becomes 'invisible'.

Some example embodiments are now discussed in relation to FIG. 1 and FIGS. 4 to 9c.

Figure 1:
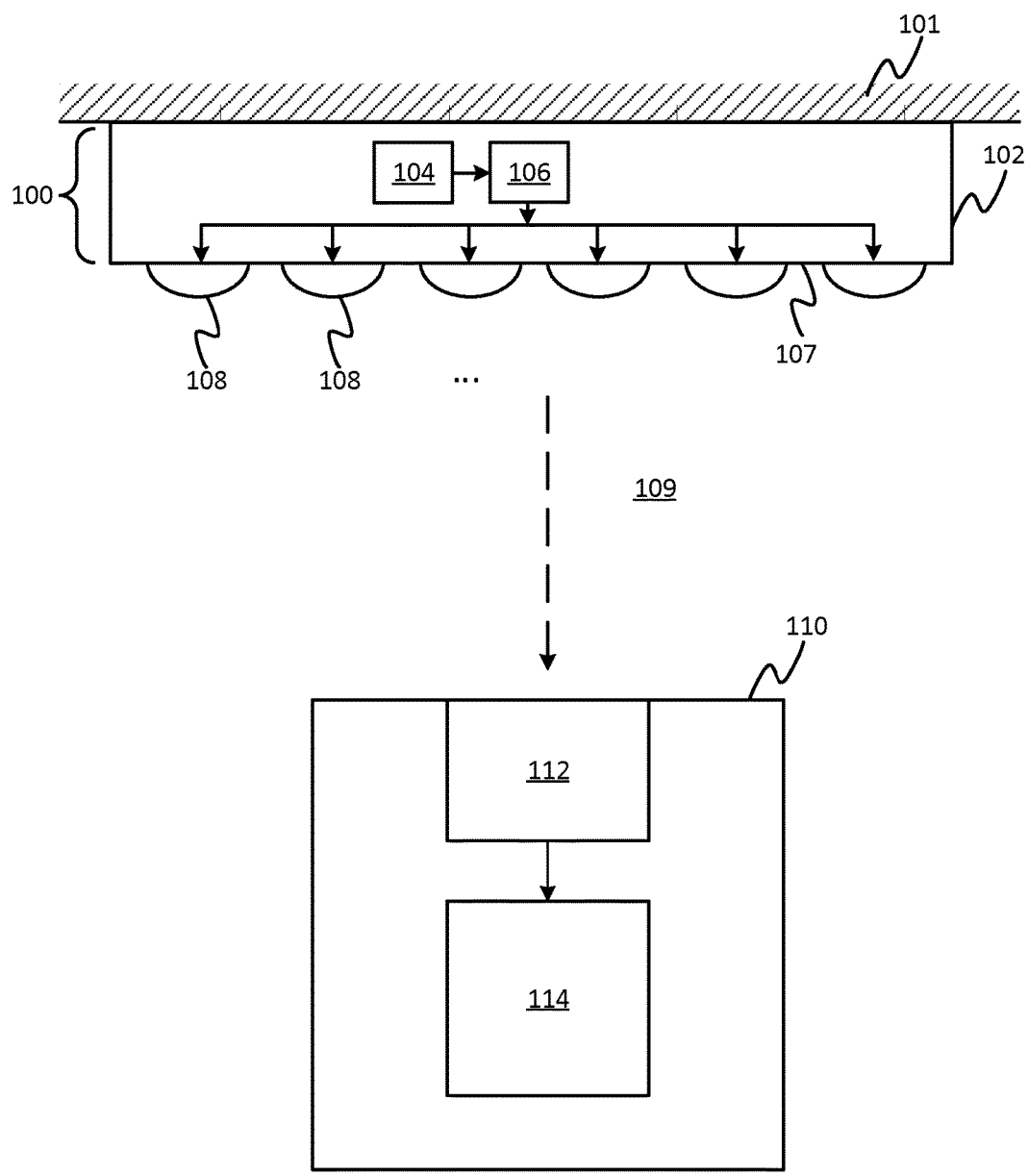
FIG. 1 is a schematic block diagram of a system comprising a luminaire and a detecting device.

FIG. 1 shows an example of a luminaire 100 for emitting coded light and detecting equipment 110 for detecting coded light in accordance with embodiments of the present disclosure. The luminaire 100 is mounted on a supporting surface 101, typically the ceiling (though this could instead be another surface such as a wall). The luminaire 100 may be mounted on the supporting surface 101 by being affixed over the supporting surface 101 (as illustrated) or by being embedded in the surface (a portion of the supporting surface 101 being cut away to accommodate the luminaire 100). Either way, the luminaire 100 is mounted so as to emit visible illumination outward from the supporting surface 101 into an environment 109 in order to contribute to illuminate that environment 109 (so as to enable human occupants to see and find their way about within the environment). The environment 109 in question may be an indoor space such as one or more rooms of an office, home or retail space; or may be an outdoor space such as a park or garden; or a partially covered space such as a stadium or gazebo.

The luminaire 100 comprises one or more light-emitting elements 108 disposed in or on a luminaire body 102 in the form of a housing or support (e.g. frame) arranged to house and/or support the light-emitting elements 108. The light-emitting elements 108 may be implemented in one or more lamps (with one or more of the light-emitting element 108 per lamp), wherein the (or each) lamp may be a removable and replaceable component to be plugged into the luminaire 100. Whatever form they take, the light-emitting elements 108 are arranged to actively emit the above-mentioned illumination into the environment 109, being disposed on an outward-facing luminous surface 107 of the luminaire body 102 (a surface facing the environment 109. The luminous surface 107 may refer herein to the surface formed by the outward-facing surface of light-emitting elements 108 themselves and the surface of the luminaire body 102 in between them (which is typically substantially reflective, either in the sense of mirror reflection or diffuse reflection). Each of the light-emitting elements 108 may take any suitable form such as an LED, a set of LEDs, or a filament bulb. The luminaire 100 further comprises a driver 106 coupled to the light-emitting element 108, and a controller 104 coupled to the driver 106. The driver 106 is arranged to supply power from a power source (not shown) to the light-emitting elements 108 in order to cause them to actively emit the illumination. By "actively" emit herein it is meant that the luminaire 100 has or is connected to a power supply (not shown) which supplies energy in a form other than light (typically electricity), and the driver 106 supplies this energy to the light-emitting elements 108 to convert into the illumination which is sent out into the environment 109. I.e. the emitted illumination is generated by the luminaire 100 (as opposed to passive absorption and re-emission of ambient light).

Furthermore, the controller 104 is arranged to control the driver 106 to vary a property of the illumination emitted by the light-emitting elements 108, typically the intensity, in order to thereby modulate the illumination and thereby embed a signal in accordance with coded light techniques which are themselves already known in the art.

A luminaire herein is meant to refer to any lighting module comprising at least one fixed or replaceable luminous element and some associated fitting, socket, support and/or housing; with the different luminaires being discrete units or modules, which are capable of being be used individually, but which can also be concatenated together into an array (in embodiments to form apparently continuous surface or trunk). E.g. in the case of a luminaire in the form of a modular luminous ceiling tile, wall tile or floor tile may, the lamp(s) may comprise one or more LEDs and the support comprises a substrate and any connections for mounting the tiles. In other embodiments, as mentioned, the luminaires may be modular sections of a modular trunk lighting system. In embodiments, a given luminaire 100 contains a single driver and single modulator and therefore emits the same code over a single luminous surface, whilst adjacent luminaires 100 emit different codes and are unsynchronized.

The controller 104 may be implemented in the form of software stored in memory of the luminaire 100 and arranged to run on a processor of the luminaire 100 (the memory in which the controller 104 is stored comprising one or more memory units and the processor on which it is arranged to run comprising one or more processing units). Alternatively the controller 104 may be implemented in dedicated hardware circuitry, or configurable or reconfigurable hardware circuitry such as a PGA or FPGA, or any combination of software and hardware.

The detecting equipment 110 comprises a camera 112 and an image processing module 114. The camera 112 is able to capture samples of the modulated illumination at different instances in time. The camera 112 may take the form of a rolling-shutter camera which exposes a given frame line-by-line in a temporal sequence, each line at different moment in time, so as to capture multiple different temporal samples of the modulation in the illumination within a given frame (a given still image). Alternatively the camera 112 may take the form of a global shutter camera which exposes the entire frame at the same time, in which case each frame samples the modulation in the illumination at a different respective time. Note also that even in the case of a rolling-shutter camera, if the message encoded into the signal lasts longer than one frame, then samples from multiple frames may be required. By whatever means the samples are captured, the camera 112 is arranged to output the samples to the image processing module 114 in order for the signal to be decoded from the captured samples, using techniques which are in themselves already known in the art.

The image processing module 114 may be implemented in the form of software stored in memory of the detecting equipment 110 and arranged to run on a processor of the detecting equipment 110 (the memory in which the image processing module 114 is stored comprising one or more memory units and the processor on which it is arranged to run comprising one or more processing units). Alternatively the image processing module 114 may be implemented in dedicated hardware circuitry, or configurable or reconfigurable hardware circuitry such as a PGA or FPGA, or any combination of software and hardware.

The detecting equipment 110 may take the form of a mobile user terminal such as a tablet, smartphone or smartwatch, and the camera 112 may be an integrated camera of the mobile user terminal with the image processing module 114 also being implemented on the same mobile user terminal (e.g. as a suitable light detection "app"). For example the user terminal may be a smartphone or tablet and the camera 112 may be the front-facing camera of the smartphone or tablet. Alternatively the camera 112 may be implemented on a separate physical unit than the image processing module. E.g. the camera 112 may be implemented on a dedicated camera unit or camera peripheral or on a smartphone, tablet or smartwatch, while the image processing module may be implemented on a separate computer unit such as a server, desktop computer or laptop computer, connected to the unit housing the camera 112 via any suitable wired or wireless connection, e.g. a wired connection such as a USB connection, or a wireless connection such as a Wi-Fi or Bluetooth connection, or via a wired or wireless network such as a wireless local area network (e.g. Wi-Fi network) and/or a wired area network or internetwork such as the Internet.

Figure 2A:
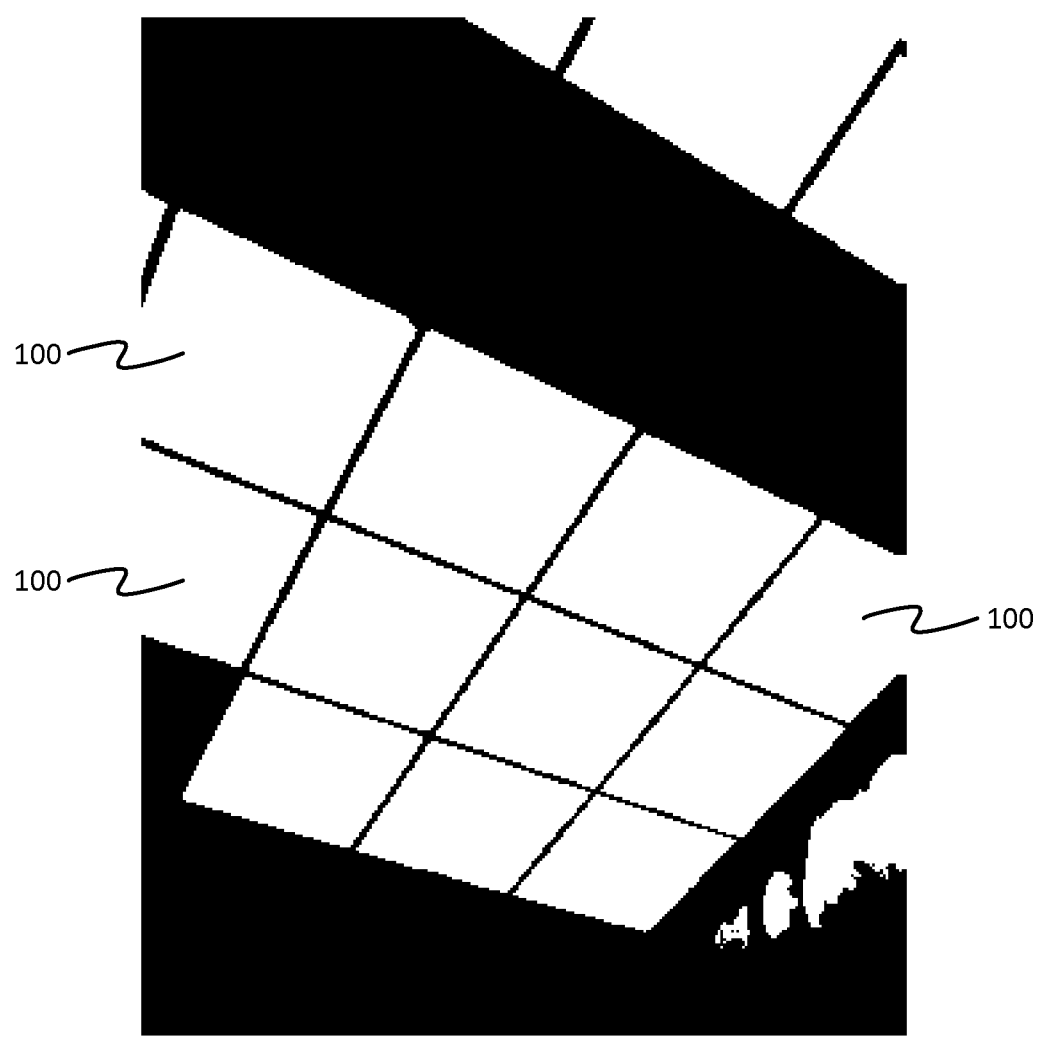
FIG. 2a is an image of an arrangement of luminaires.

Only one luminaire 100 is shown in FIG. 1, but in fact an array of such luminaires 100 (preferably three or more) are concatenated together to form a lighting system, e.g. as shown in FIG. 2a. Each of the multiple luminaires 100 is mounted on the supporting surface 101 in a similar manner as described above. Alternatively the luminaires 100 do not have to be mounted on a supporting surface 101, but instead may be mounted to another structure (e.g. a gantry) so as themselves to define a surface or line. Either way, the surface or line may be confined to either a plane or straight-line, i.e. which is flat, or may follow a contour which is curved either in one or two dimensions. Typically this plane or contour is that of the ceiling or possibly a wall, and typically the ceiling or wall is flat (a plane), but it is also not excluded that the multiple luminaires 100 could be arranged to confirm to a surface contour, e.g. a curved ceiling or wall, or a curved gantry structure. Note also that the array of luminaires 100 may be one or two dimensional, such that in some embodiments the array extends in both dimensions of the plane or a two-dimensional contour, whereas in some other embodiments the luminaires 100 may be arranged in a straight along a curved line.

Figure 2B:
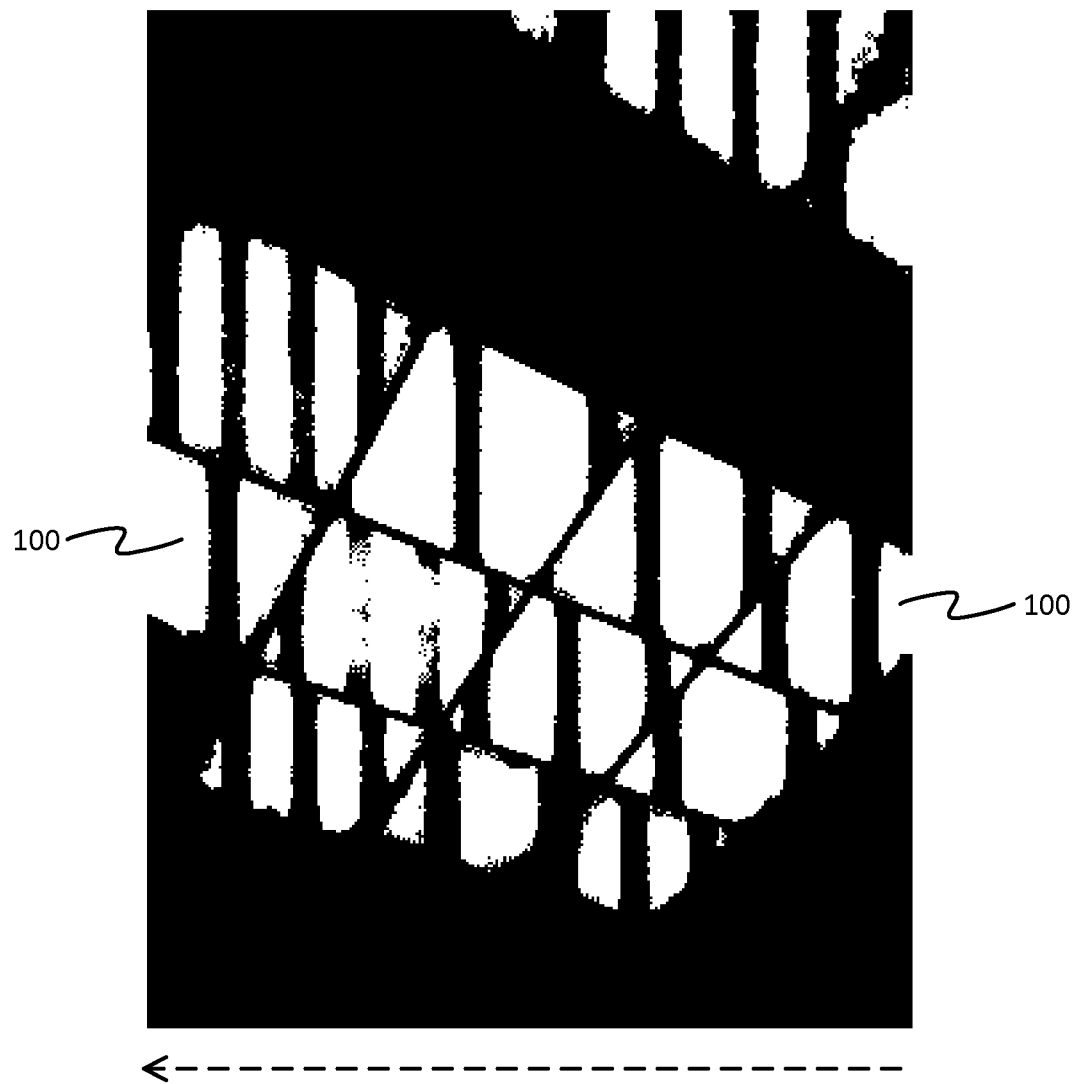
FIG. 2b is an image of an arrangement of luminaires captured by a rolling shutter camera, including a rolling pattern due to codes embedded in the light emitted by the luminaires.

Either way, the luminaires 100 are concatenated together in the 1D or 2D array such that, within said plane or along said line or contour, each of the multiple luminaires 100 is adjacent to at least one other of the multiple luminaries 100, sharing a boundary between them. For example the luminaires 100 may be arranged in a 2D rectangular array as shown in FIG. 2, or a 1D linear array as shown in FIG. 3a.

Further, each of the luminaires 100 is arranged to emit a different respective coded light signal embedded in its respective illumination, for example a unique ID code identifying the respective luminaire within the system, and/or other information specific to the luminaire in question such as a respective location, timestamp and/or status report (e.g. reporting burning hours and/or operating temperature, etc. note therefore that the signal is not limited to comprising only the ID code). The signals may originate from the respective controllers 104 of the different respective luminaires 100, being generated locally by each in a distributed fashion, or alternatively each controller 104 may generate its signal under control by a central controller (not shown) such as a server. In the latter case the central controller may be connected to the local controller 104 of each of the luminaires 100 by any suitable wired or wireless connection, e.g. via a wireless local area network (WLAN) such as a Wi-Fi, Bluetooth or ZigBee network, or via a wide area network or internetwork such as the Internet.

Also, referring again to FIG. 3a, there is a visible separation 301 between each adjacent pair of the multiple luminaires 100. The image processing module 114 is configured with an image recognition algorithm which is able to use the appearance of the separation 301 between adjacent luminaires in the array to distinguish between the signals from the different luminaires 100, again using techniques which are in themselves known in the art. Thus even if the different coded light signals are embedded at the same modulation frequency and have no other form of channel separation (e.g. do not use time division or code division multiple access), then the image processing module 114 is able to separate out the individual signals from different individual ones of the multiple luminaires 100.

The separation 301 allows the light from the different luminaires, and therefore the signals, to be distinguished from one another even when more than one of the luminaires 100 appear simultaneously in the same image or simultaneously in each of a sequence of images capturing the same view of the environment, i.e. even when appearing in the same frame or together in each of the same sequence of frames (that is, falling at the same time in the same frame area or image capture area of the camera's image sensor, from which the images are captured). In the case of a rolling-shutter camera, this may even allow detection of the signals from more than one luminaire appearing simultaneously in the same frame (same single still image).

As discussed previously, it would be desirable if the separation 301 between adjacent luminaires 100 was not visible to human occupants of the environment 109, but was still visible to the image processing module 114 via the images captured by the camera 112 in order to distinguish between the different coded light signals.

Figure 4:
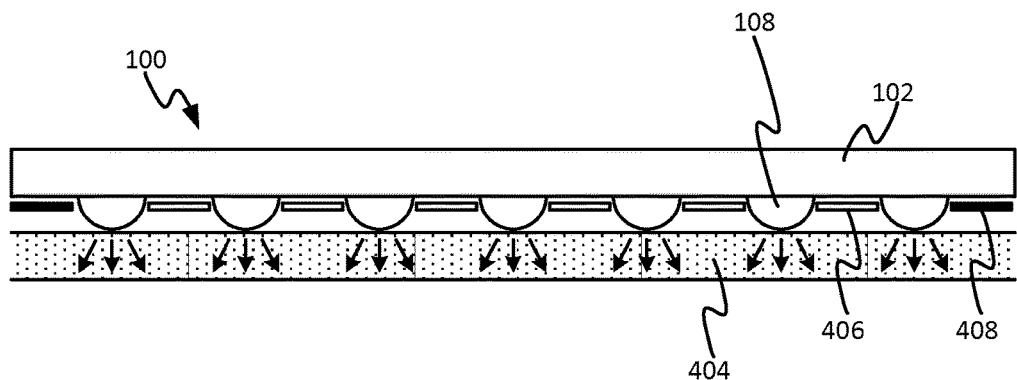
FIG. 4 is a schematic illustration of a luminaire with a diffuser layer.
Figure 5:
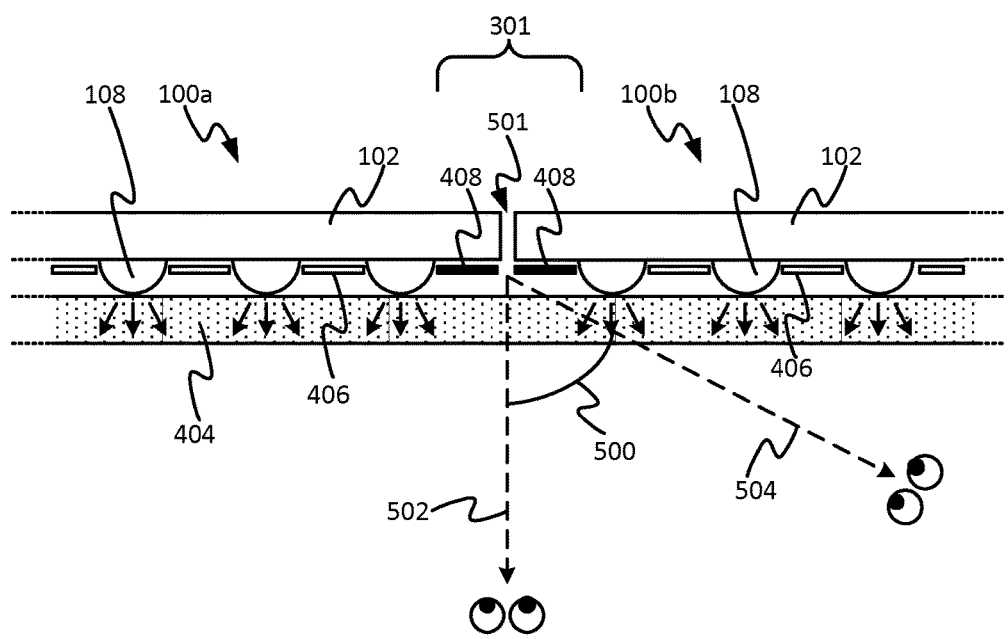
FIG. 5 is a schematic illustration of an arrangement of concatenated luminaires with a diffuser layer to obscure the boundary between adjacent luminaires as a function of viewing angle.
Figure 6A:
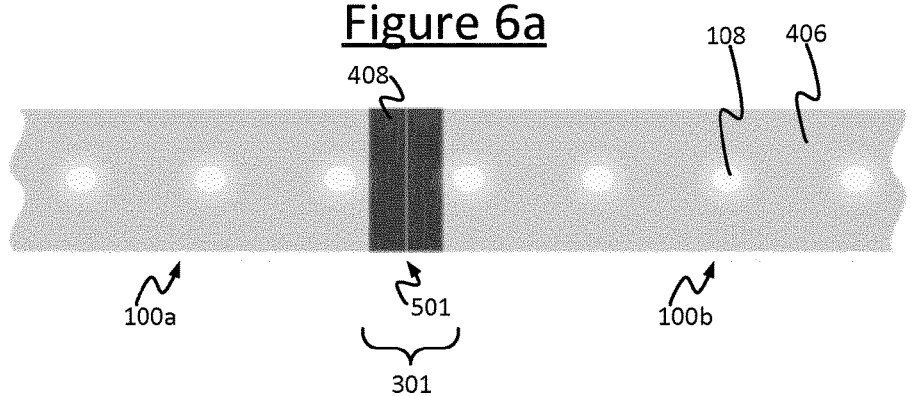
FIG. 6a is a depiction of the arrangement of FIG. 5 without the diffuser layer.
Figure 6B:
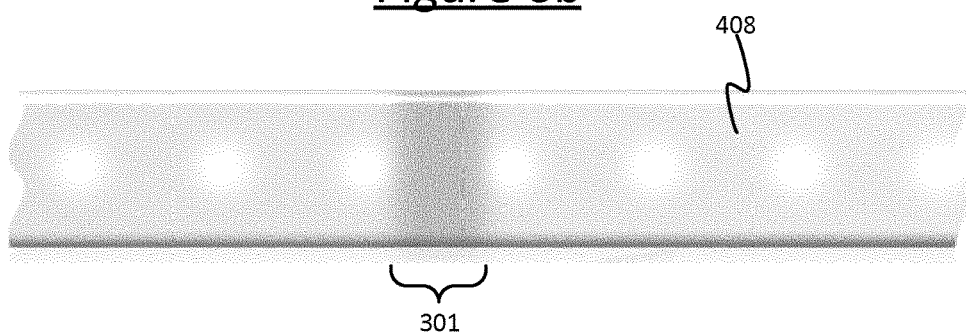
FIG. 6b is a depiction of the arrangement of FIG. 5 viewed from a perpendicular angle through the diffuser layer.
Figure 6C:
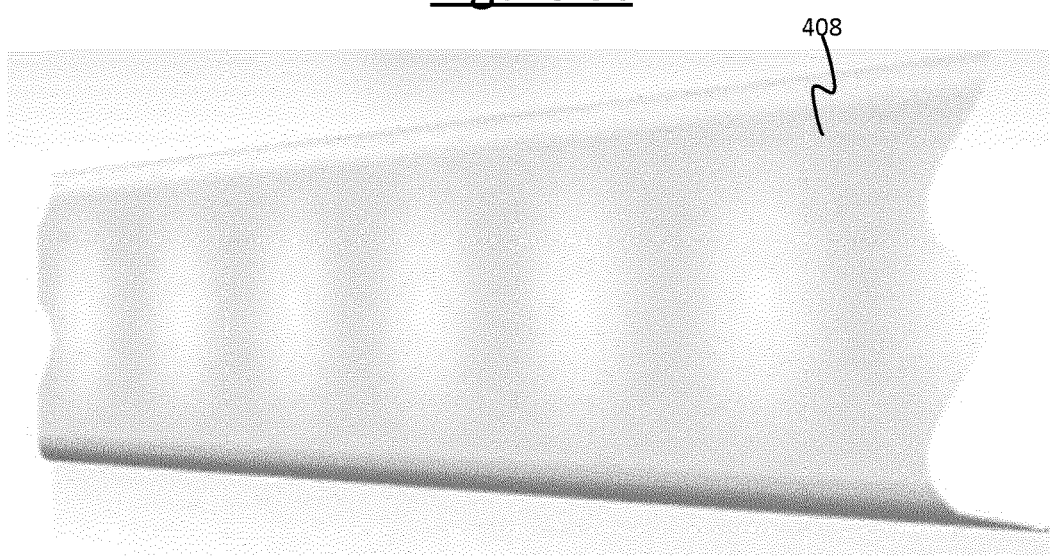
FIG. 6c is a depiction of the arrangement of FIG. 5 viewed from an oblique angle through the diffuser layer.

FIGS. 4, 5, 6a, 6b and 6c illustrate one example of how the system of FIG. 1 may be modified to achieve this in accordance with embodiments disclosed herein. FIG. 4 shows a side view of an individual one of the luminaires 100 within the array; FIG. 5 shows a side view of an adjacent pair 100a, 100b of the luminaires 100 within the array; FIG. 6a shows a perpendicular view of the pair of adjacent luminaires 100a, 100b without a mask 404 in place; FIG. 6b shows a perpendicular view of the pair of adjacent luminaires 100a, 100b through an angle-dependent mask 404; and FIG. 6c shows an oblique view of the pair of adjacent luminaires 100a, 100b through the angle-dependent mask 404.

As shown, each pair adjacent luminaires 100a, 100b in the array have a periphery region 301 between them, i.e. a boundary region, which acts as a visible separation between them. Based upon images of this separation 301 captured by the camera 112, the image processing module 102 can distinguish the light from the different luminaires and thereby differentiate between the different coded light signals (as explained above). The periphery region 301 is a region from which no illumination is actively emitted into the environment 109. That is, light is not actively generated from this region (in the sense explained above), though it is not excluded that some passive scattering of incident ambient light might occur here. The periphery region 301 may comprise a gap or join 501 between the adjacent edges of the adjacent luminaires. E.g. in the case of a join this may comprise a portion of adhesive, or a supporting structure. Alternatively or additionally, the periphery region 301 may comprise a visually distinctive part along the adjacent edge of one or both of the adjacent luminaires 100a, 100b. For example, this may comprise a dark, light-absorbing (preferably black) strip 408 along one or both of the edges, e.g. black paint. To improve the contrast, the luminous surface 107 in the middle (non-periphery) region of each luminaire 100 between the light-emitting elements 108 (e.g. between LEDs) may be provided with portions 406 having a light-reflecting color (preferably white), e.g. white paint.

Furthermore, an angle-dependent mask 404 is placed over the luminous surface 107 of the multiple luminaires 100 and the periphery regions 301 between each adjacent pair of luminaires 100a, 100b. This may also be described as an angle-dependent (i.e. anisotropic) façade, cover, overlay or concealment layer. I.e. the mask 404 is placed between the luminous surface 107 and the environment 109, so as to cover the luminous surfaces 107 and periphery regions 301 there between from the perspective of a camera 112 or human viewed in the environment 109. The angle-dependent mask 404 is a layer whose appearance varies as a function of viewing angle 500 so as to create a viewing-angle dependent visibility of the luminaire separation 301. Note that a view herein may refer to the view of a person or the camera 112. The viewing angle 500 is defined as the angle between (a) the direction from which a given point in the luminaire array is being viewed and (b) the normal (perpendicular) to the plane, line or contour in which the luminaires 100 of the array are mounted. In the case of luminaires being mounted in a plane, as is the most common case, then this means the angle between the viewing direction and the perpendicular to the plane. In the case where the plane is horizontal (e.g. a flat ceiling), the viewing angle is the angle between the viewing direction and the vertical direction. However it is not excluded that the luminaires could conform to a contour that is curved in one or two dimensions, in which case the viewing angle 500 is the angle between the viewing direction and the normal to the contour.

Note also that in the case that the luminaires are arranged in a 1D array along a straight or curved line (e.g. a 1D straight line of trunk lighting), the line along which the lighting is arranged and the viewing direction (the line of sight of the person or camera, depending on which is being considered) are two non-parallel lines which define a plane. The normal is then the normal in that plane. In a 2D plane or curved surface of course, the normal is unambiguously defined by any given point on the plane or surface.

The dependency on viewing angle 500 is such that from greater (more oblique) values of the viewing angle 500, the periphery region 301 (i.e. boundary region) between adjacent luminaires 100a, 100b in the array becomes less visible relative to the surrounding luminous surface of the luminaires, whereas from lesser (more perpendicular) values of the viewing angle 500 the periphery region 301 (i.e. boundary region) becomes more visible relative to the surrounding luminous surface.

The decoder 114 in the detecting equipment 110 is configured so as to detect, through the angle dependent mask, the subtle but characteristic intensity variation in the registered luminous intensity in the images, and based thereon to segment the light sources 100 so as to simplify detection.

In the example of FIGS. 4 to 6c, the angle-dependent mask 404 takes the form of a light-diffusing layer. As shown in FIG. 5, this means light will pass through a longer optical path 504 through the diffuser 404 when viewed from an oblique viewing angle 500, compared to the optical path 502 when the viewing angle is perpendicular to plane, straight line or contour of the luminaires 100.

FIG. 4 depicts a side view of one of the multiple luminaires 100 which in concatenation form the lighting system. E.g. the luminaire 100 comprises a frame 102, on which multiple light-emitting elements 108 are mounted (e.g. LEDs). The frame 102 is partially covered with a bright reflective layer (e.g. white paint) 406 between the luminous elements. At the borders, the frame is covered with a dark layer (e.g. black paint) 408. A mask 404 in the form of a translucent diffuser 404 covers the luminaires 100, as well as the gaps or joins 501 there between. FIG. 5 depicts a side view of two adjacent luminaires 100a, 100b which can be part of a (larger) lighting system 100 covered by the common diffusing layer 404. Note that the Figures herein are not necessarily to scale.

FIG. 6a-6c show an upward view towards the ceiling in an example deployment of the system of FIGS. 4 and 5. They show the appearance of the output window of the two adjacent luminaires 100a, 100b in different situations. FIG. 6a shows the situation without the diffuser layer 404. Here one looks directly on the light-emitting elements 108 (e.g. LEDs) and the surrounding reflective surface which is only dark at the border 408 of each of the luminaires 100, and/or has a visible gap or join 501 between adjacent luminaires 100a, 100b. FIG. 6b shows the same view as FIG. 6b but with the diffuser layer 404 in place. Here the perpendicular view reveals the visible darker border area 408 and gap or join 501 at the transition between two luminaires 100a, 100b. FIG. 6c shows the same arrangement as FIG. 6b but viewed under an oblique angle 500. Here the longer optical path 504 through the diffuser 404 causes both the light-emitting elements 108 as well as the dark band 408 and join or gap 501 to fuse with the light from the reflective frame 102, 406 such that there is no luminaire transition visible.

Thus based on the above-described arrangement or similar, when (and only when) the camera 112 captures one or more images of the luminaire array through the angle-dependent mask 404 from a viewing angle below a first threshold value, the separating pattern of the periphery regions 301 is visible to the image processing module 114 in the captured images. Hence based on this pattern the image processing module 114 can distinguish between the light from different ones of the luminaires, including adjacent luminaires 100*a*, 100*b*, in order to extract the different respective coded light signals embedded therein. E.g. this kind of viewing angle is likely to occur when the detecting equipment 110 comprises a smartphone or tablet and the camera 112 is the front-facing camera of the smartphone or tablet, when the user is holding the smartphone or tablet relatively close to the horizontal to both view its screen and capture images of the luminaires 100 on the ceiling above. However, when a human occupant of the environment 109 with average vision and attentiveness views the luminaire array through the angle-dependent mask 404 from an oblique viewing angle above a second threshold value (which may be equal to or greater than the first threshold value), then the periphery regions 301 between luminaires 100, 100*a*, 100*b* are not visible to that user, providing an appearance of a uniform luminous surface. This kind of viewing angle is likely to occur for most human occupants, who typically do no look directly up at the ceiling.

The first threshold value $\theta_1$ of the viewing angle is the maximum value at which the image processing module 114 is able to distinguish between at least one pair 100*a*, 110*b* of the luminaires 100 in order to detect their respective coded light signals. It is a predetermined feature of a combination of the particular chosen diffuser layer 404, image recognition algorithm of the image processing module 114, and contrast between the periphery regions 301 and luminous surfaces 107. At less than the first threshold value, the detection process does not work. Effectively this is the threshold beyond which the luminous intensity difference between the emitted illumination and the gap/join 501 becomes too weak for the detector 110 to be able to distinguish between the illumination from different luminaires 100 and therefore to be able to perform detection of the coded light signals when multiple luminaires 100 appear in the image(s). For example, one method of establishing this threshold is to determine an angle at which a given camera 112 (such as a particular current model of current smart phone camera) at a predetermined point, under a predetermined angle, would still reliably detect (within a predetermined likelihood), the boundary 501 between luminaires 100. In this case the criterion may be that at this critical angle, the typical detection device 110 still detects a predetermined difference between the registered luminous intensity of the periphery area 501 and the non-periphery area 107 of the luminaire.

The second threshold value is the minimum value at which the periphery regions 301 are noticeable to the average human occupant of the environment 109. This is determined by a combination of the chosen diffuser layer 404, the contrast between the periphery regions 301 and luminous surfaces 107, and the perception of the people the environment 109 is intended for, as well as their attentiveness. The noticeability to an average person for the present purposes may be defined in any of a number of ways. E.g. the diffuser 404, periphery regions 301 and luminous surface 107 may be designed such that beyond a certain second threshold value $\theta_2$ then no more than a defined percentile from a representative random sample of people (e.g. no more than 1% of the most perceptive people, or no more than 5%) will notice the periphery regions 301. As another example the diffuser 404, periphery regions 301 and luminous surface 107 may be designed such that beyond a certain second threshold value $\theta_2$ then the periphery regions 301 will not be noticeable to a person with a mean, median or modal value of a defined metric for quantitatively measuring the visual acuity. In either case the sample may or may not be restricted to a certain category of people, e.g. intended users of the environment 109, and/or those who are not classified as partially sighted in the jurisdiction in which the environment 109 is located. Alternatively or additionally, the mask 404 may be designed meet a different criterion for being invisible beyond the second threshold $\theta_2$, e.g. according to the concept of "just noticeable difference" (JND), also known as "Weber's Law". As will be familiar to a person skilled in the art, Weber's Law states that in the presence of ambient illumination, a temporally stable intensity variation is just noticeable when contrast is about:

$$C = \frac{\Delta I}{I} = \frac{1}{100}$$

This ratio of 1/100 is remarkably stable for a large range of illumination levels. In the context of the present disclosure, I is the output of the luminaire 100 and $\Delta I$ the maximum amount by which the intensity may differ when viewed from a greater angle than $\theta_2$. With regard to the color spectrum (if applicable), a similar condition may be applied for the color channels in any suitable color space, e.g. in YUV space the chrominance channels U and V may be arranged to satisfy $\Delta U/U \leq 1/100$ and $\Delta V/V \leq 1/100$; or in RGB space, $\Delta R/R \leq 1/100$, $\Delta G/G \leq 1/100$ and $\Delta B/B \leq 1/100$. Weber's Law is known by many in the field of human factors and ergonomics.

Alternatively or additionally, in other embodiments the pattern may be designed to satisfy another criterion for invisibility relative to the luminaires 100*a*, 110*b*. For instance, apart from Weber's Law there also exist other criteria that relate to the apparent size of the brightness variation. These are based on the average human contrast sensitivity related to the dimensions of the contrast variation (e.g. expressed as a contrast threshold expressed as a function of minutes of arc). See for example, "Outdoor Lighting: Physics, Vision and Perception", Duco Schreuder, Springer Science 2008, ISBN: 978-1-4020-8601-4. In general, a skilled person will be aware of various criteria for defining invisibility to human perception.

Various criteria for invisibility to human visual perception will in themselves be known to a person skilled in the art.

Also, in embodiments, the coded light and the periphery regions 301 need only be masked from the perspective of a user standing on the floor whilst the luminaires 100 are mounted at ceiling height in the environment 109 in question (e.g. 5 m or more from floor height in a large retail environment).

Note: preferably the diffusing mask 404 is continuous and uniform over both the periphery regions 301 and the luminous surface 107 of all the luminaires 100 in the array, so as to give the maximum appearance of uniformity to users. However, it is not excluded that the mask 404 could be placed only over the periphery regions 301, as this may still give a reasonable effect of hiding the periphery regions 301.

Figure 7:
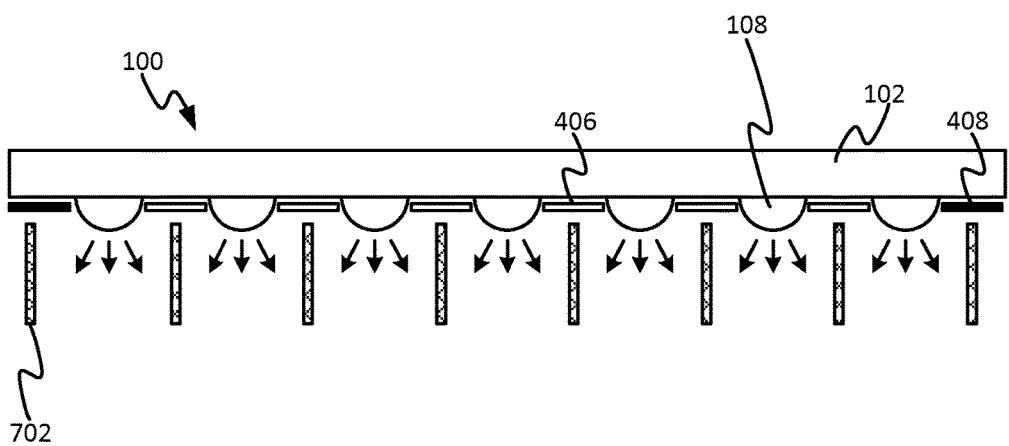
FIG. 7 is a schematic illustration of a luminaire with a collimator layer.
Figure 8:
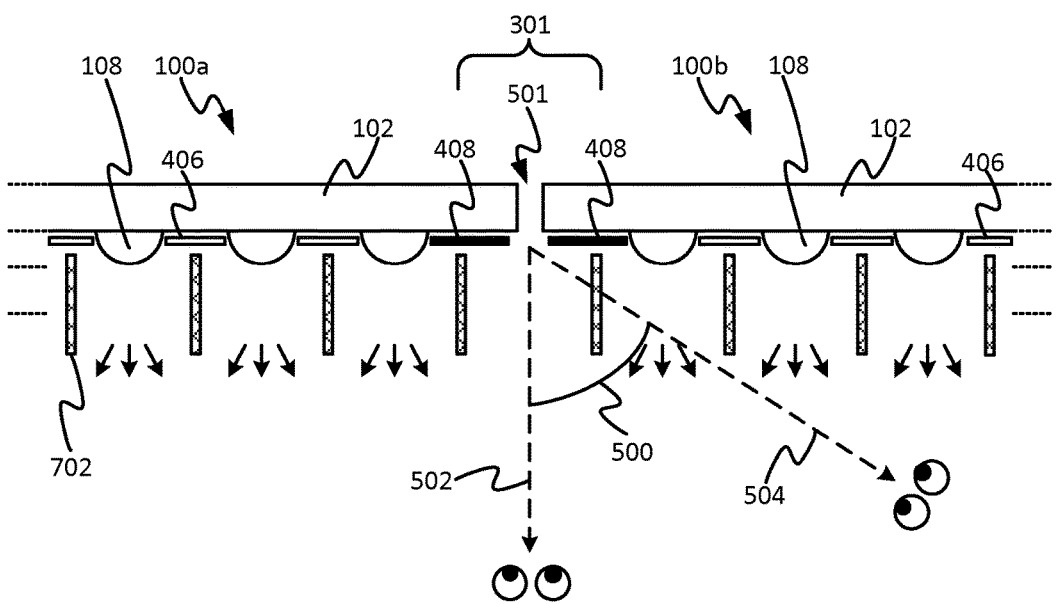
FIG. 8 is a schematic illustration of an arrangement of concatenated luminaires with a collimator layer to obscure the boundary between adjacent luminaires as a function of viewing angle.
Figure 9A:
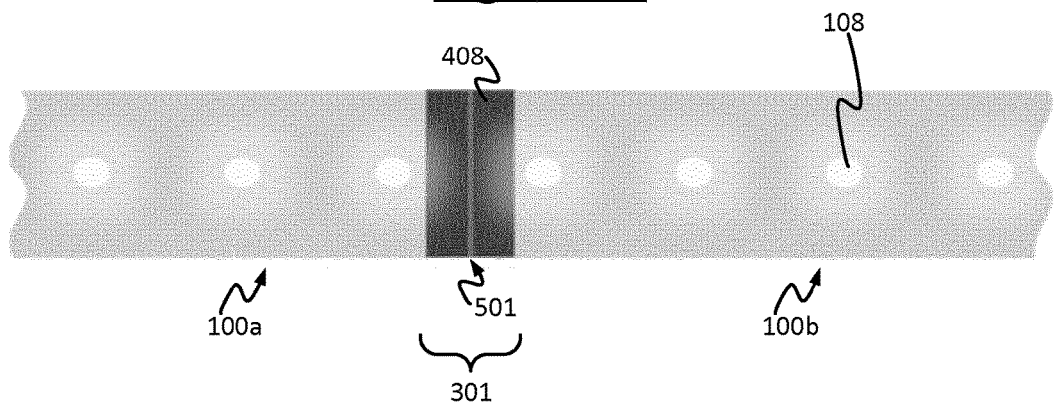
FIG. 9a is a depiction of the arrangement of FIG. 8 without the collimator layer.
Figure 9B:
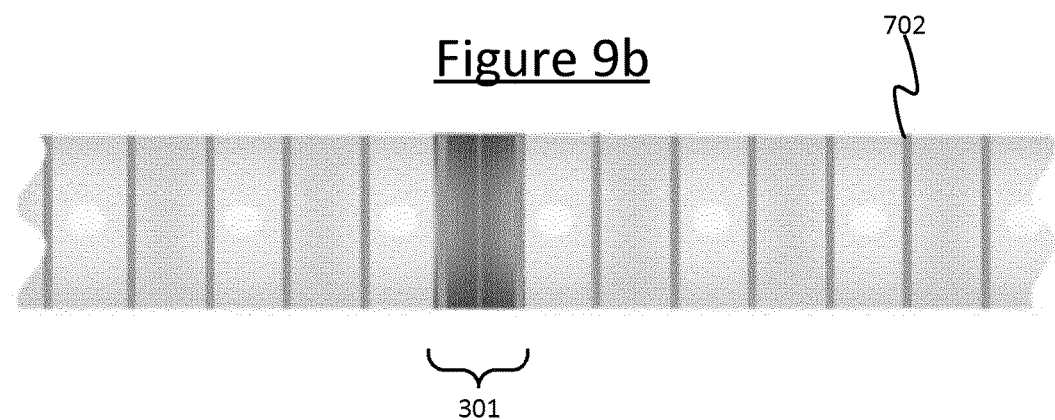
FIG. 9b is a depiction of the arrangement of FIG. 8 viewed from a perpendicular angle through the collimator layer.
Figure 9C:
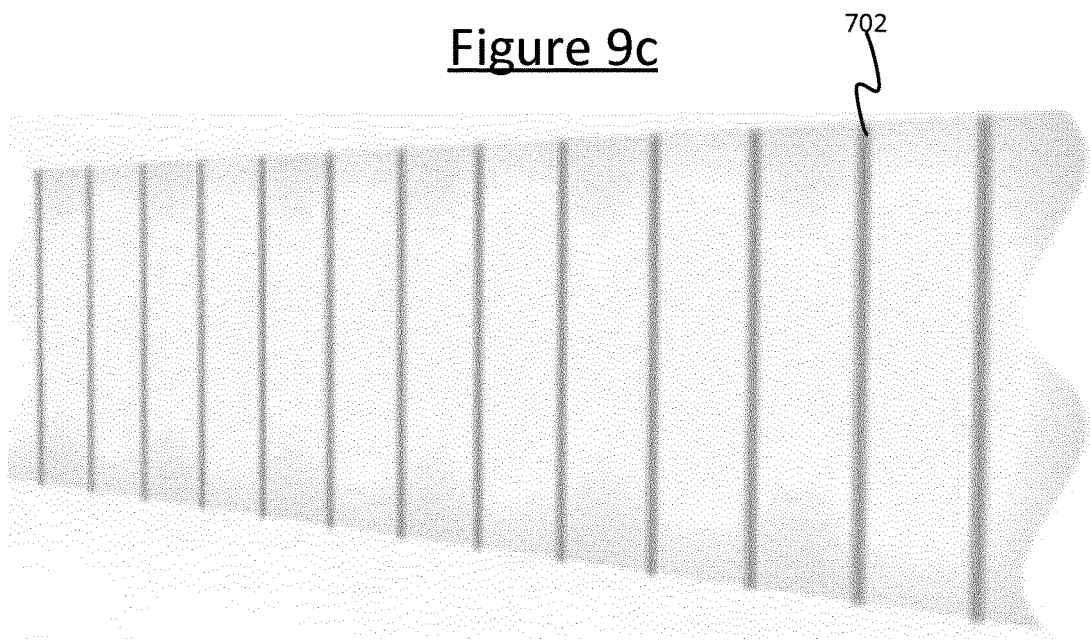
FIG. 9c is a depiction of the arrangement of FIG. 8 viewed from an oblique angle through the collimator layer.

Another example embodiment is illustrated in FIGS. 7, 8, 9a, 9b and 9c. In this embodiments, the angle-dependent mask takes the form of an array of light-collimating elements ("shields") 702 is used to create a viewing-angle dependent visibility of the luminaire separation 301. The effect of the viewing on the appearance of the luminaire is depicted in FIGS. 9a-9c.

The array of collimating shields 702 has a substantially similar effect as described above in relation to the diffuser layer 404, except that this is achieved not may changing the optical path length as a function of viewing angle, but instead arranging the shields 702 substantially perpendicular to the plane or contour of the luminous surface 107. The effect of this is that beyond a certain second threshold value of the viewing angle then the line of slight to the periphery regions 301 is completely or substantially blocked (such that they are not noticeable to the average person). However below a certain first threshold value, enough of the periphery regions 301 is visible to the image processing module 114 in the captured images so as to enable detection and separation of at least a pair of adjacent luminaires 100a, 100b in the array.

FIG. 7 depicts a side view of one of the multiple luminaires 100 which in concatenation these form the lighting system. FIG. 8 depicts a side view of two adjacent luminaires 100a, 100b which can be part of a (larger) lighting system 100 covered by the common diffusing layer 404. Note that the Figures herein are not necessarily to scale. For example the luminaire 100 again comprises a frame 102, on which multiple light-emitting elements are mounted (e.g. LEDs). The frame is partially covered with a bright reflective layer (e.g. white paint) 406 between the light emitting elements 108. At the borders, the frame 102 is covered with a dark layer (e.g. black paint) 408. A collimator array 702 is placed in front of the array of light-emitting elements such that under oblique viewing angles 500 the light-emitting elements 108 are not directly visible, and the only light that escapes is due to internal reflection within the luminaire 100.

FIGS. 9a-9c show an upward view towards the ceiling in an example deployment of the system of FIGS. 4 and 5. They show the appearance of the output window of the two adjacent luminaires 100a, 100b in different situations, viewed from below pointing upwards towards the ceiling. FIG. 9a shows the situation without a collimator 702, where one looks directly on the light-emitting elements 107 (e.g. LEDs) and the surrounding reflective surface 107 which is only dark at the border 408 of each of the composing luminaires 100a, 100b. FIG. 9b shows the situation with a collimator 702. Here the perpendicular view reveals a visible darker area 408 at the transition between two luminaires 100a, 100b. FIG. 9c shows the same situation but viewed under an oblique angle. Here the direct view on the dark separator 408 is blocked such that there is no luminaire transition visible.

Figure 10A:
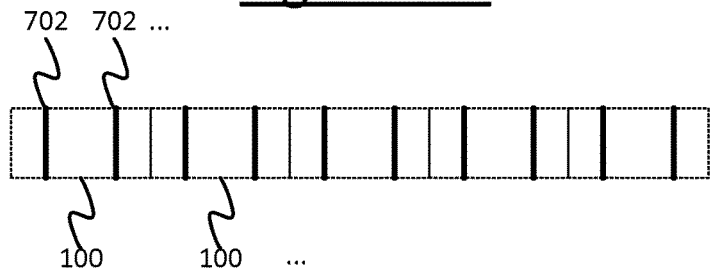
FIG. 10a is a plan view of a 1D array of luminaires with a 1D collimator structure.
Figure 10B:
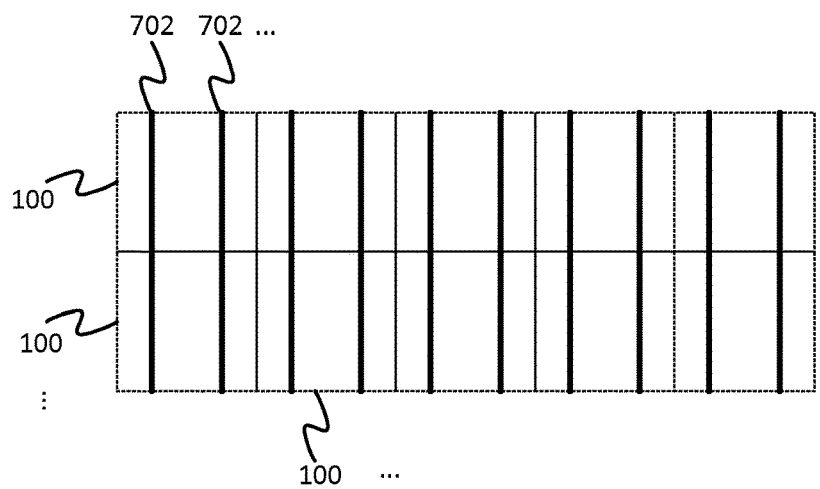
FIG. 10b is a plan view of a 2D array of luminaires with a 1D collimator structure.
Figure 10C:
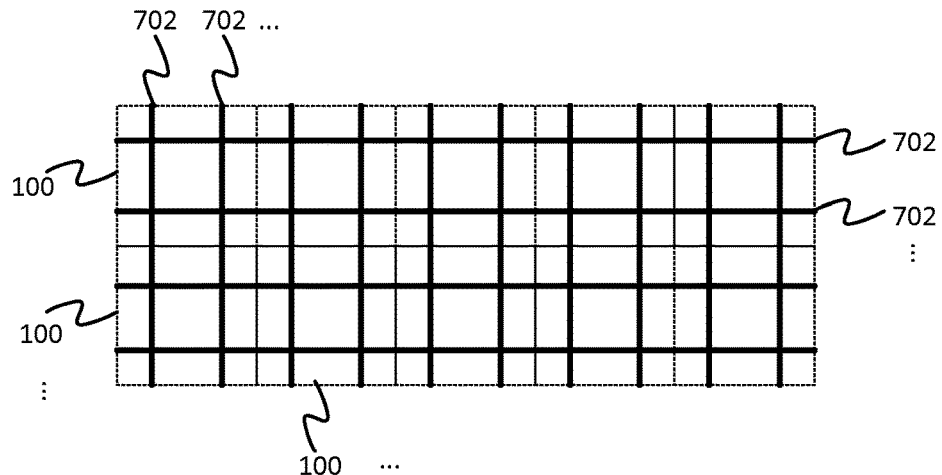
FIG. 10c is a plan view of a 2D array of luminaires with a 2D collimator structure.

As illustrated in FIGS. 10a-10c, note that the structure of the collimator layer may take a number of different possible forms depending on the spatial arrangement of the array of luminaires 100 and the orientation or orientations from which the array is designed to be viewed. FIG. 10a illustrates a top view (or rather bottom-up or vertical view, or plan view) of a linear 1D array of luminaires 100 arranged in the plane of a ceiling, though this will affect the anisotropy of the structure. Here the collimator layer comprises an array of "plates" along the direction of the line of luminaires 100. FIGS. 10b and 10c illustrate plan views of a 2D array of square luminaire tiles 100 arranged in the plane of the ceiling. In FIG. 10b the collimator layer comprises only a 1D array of plates along one direction in the array, in the plane of the ceiling, parallel to one of the two perpendicular directions defined by the edges of the squares. This allows the gaps or joins 501 between luminaires to be invisible from at least one orientation of the viewer within the plane of the ceiling. In FIG. 10c shows and example where the collimator layer comprises a 2D matrix of intersecting plates, in this case perpendicular to one another in the plane of the ceiling. This allows the joins of gaps 501 to become invisible in multiple orientations of the viewer. Other structures are also possible, e.g. tessellating array of hexagonal plates in the plane of the ceiling.

In further embodiments, instead of light diffusion or light collimation any other technique can be used, such as light refraction, light diffraction and light reflection, or any combination of techniques.

An exemplary application of the present invention is in ceiling mounted professional lighting systems where esthetical uniform appearance of the luminaires is as important as the quality of the services that are enable by the coded light such as indoor localization. For instance the invention may be applied to trunk illumination systems for retail environments, or planar luminous ceiling solutions. As another example, the invention can be applied to luminous textiles or luminous carpets.

It will be appreciated that the above embodiments have been described by way of example only. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A system comprising:
multiple luminaires arranged to actively emit visible illumination light to illuminate an environment, the multiple luminaires being mounted contiguously in a plane, along a straight line or following a one or two dimensional contour, but with a visible periphery between each adjacent pair of the contiguous luminaires, wherein visible illumination is not actively emitted from the periphery;
transmission circuitry arranged to embed a different respective signal into the visible illumination emitted by each of the multiple luminaires, the respective signals being embedded by means of a modulation using a modulation frequency and modulation depth, that results in the modulation being imperceptible to humans;
detecting equipment comprising a camera for capturing one or more images of a plurality of said multiple luminaires, and an image processing module configured to detect the respective signals from the one or more images of those luminaires, wherein the image processing module of the detecting equipment is configured to distinguish between the different signals embedded in the illumination from said plurality of luminaires based on the periphery between adjacent luminaires being visible in said one or more images; and an angle-dependent mask arranged to cover at least the periphery between adjacent luminaires, such that an appearance of the periphery when viewed from said environment through said angle-dependent mask varies as a function of viewing angle, becoming less visible at greater values of the viewing angle, the viewing angle being the angle between a corresponding viewing direction and a normal to said plane, line or contour at a point at which the viewing direction intersects the plane, line or contour; and wherein the image processing module of the detecting equipment is configured to distinguish between the different signals based on the periphery between adjacent luminaires being visible in said one or more images through the angle-dependent mask when captured from less than a predetermined value of the viewing angle.

2. The system of claim 1, wherein the angle-dependent mask also covers the multiple luminaires.

3. The system of claim 1, wherein the angle-dependent mask is a diffuser layer.

4. The system of claim 1, wherein the angle-dependent mask is an array of collimating shields.

5. The system of claim 1, wherein the periphery comprises a visible join or gap between each of the pairs of adjacent luminaires.

6. The system of claim 1, wherein the periphery comprises a strip of light-absorbing material along at least one edge between each of the pairs of adjacent luminaires.

7. The system of claim 1, wherein each of the multiple luminaires comprises a set of light-emitting elements, and further comprises a light-reflecting material between the light-emitting elements.

8. The system of claim 1, wherein the detector equipment comprises a mobile user terminal and the camera is a camera of the mobile user terminal.

9. The system of claim 1, wherein the luminaires are arranged in said plane.

10. The system of claim 1, wherein the luminaires are arranged in said plane or contour, and wherein said plane or contour is a ceiling.

11. Lighting equipment comprising:
multiple luminaires arranged to actively emit visible illumination light to illuminate an environment, the multiple luminaires being mounted contiguously in a plane, along a straight line or following a one or two dimensional contour but with a visible periphery between each adjacent pair of the contiguous luminaires, wherein visible illumination is not actively emitted from the periphery;

transmission circuitry arranged to embed a different respective signal into the visible illumination emitted by each of the multiple luminaires, the respective signals being embedded by means of a modulation using a modulation frequency and modulation depth, that results in the modulation being imperceptible to humans; and an angle-dependent mask arranged to cover at least periphery between adjacent luminaires, such that an appearance of the periphery when viewed from said environment through said angle-dependent mask varies as a function of viewing angle, becoming less visible at greater values of the viewing angle, the viewing angle being the angle between a corresponding viewing direction and a normal to said plane, line or contour at a point at which the viewing direction intersects the plane, line or contour.

12. A method of emitting illumination comprising:
using multiple luminaires to actively emit visible illumination light to illuminate an environment, the multiple luminaires being mounted contiguously in a plane, along a straight line or following a one or two dimensional contour, but with a visible periphery between each adjacent pair of the contiguous luminaires, wherein visible illumination is not actively emitted from the periphery; and embedding a different respective signal into the visible illumination emitted by each of the multiple luminaires, the respective signals being embedded by means of a modulation using a modulation frequency and modulation depth, that results in the modulation being imperceptible to humans;

where the emission of said illumination comprises emitting the illumination through an angle-dependent mask covering at least the periphery between adjacent luminaires, such that an appearance of the periphery when viewed from said environment through said angle-dependent mask varies as a function of viewing angle, becoming less visible at greater values of the viewing angle, the viewing angle being the angle between a corresponding viewing direction and a normal to said plane, line or contour at a point at which the viewing direction intersects the plane, line or contour.

13. A luminaire arranged to actively emit visible illumination light to illuminate an environment, the luminaire suitable for mounting in combination with other such luminaires as a contiguously-mounted plurality of luminaires in a plane, along a straight line or following a one or two dimensional contour but with a visible periphery between the luminaire and an adjacent one of the contiguous luminaires when so mounted, wherein visible illumination is not actively emitted from the periphery; the luminaire comprising:

transmission circuitry arranged to embed a signal into the visible illumination emitted by the luminaire, the signal being embedded by means of a modulation using a modulation frequency and modulation depth, that results in the modulation being imperceptible to human vision; and an angle-dependent mask arranged to cover at least the periphery of the luminaire, such that an appearance of the periphery when viewed from said environment through said angle-dependent mask varies as a function of viewing angle, becoming less visible at greater values of the viewing angle, the viewing angle being the angle between a corresponding viewing direction and a normal to said plane, line or contour at a point at which the viewing direction intersects the plane, line or contour.

* * * * *